(12) United States Patent
Chan et al.

(10) Patent No.: US 8,339,590 B2
(45) Date of Patent: Dec. 25, 2012

(54) FIBER CABLE DISTORTION DETECTION SYSTEM AND METHOD

(75) Inventors: Eric Yuen-Jun Chan, Mercer Island, WA (US); Dennis G. Koshinz, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 788 days.

(21) Appl. No.: 12/398,125

(22) Filed: Mar. 4, 2009

(65) Prior Publication Data

US 2010/0226646 A1    Sep. 9, 2010

(51) Int. Cl.
*G01N 21/00* (2006.01)

(52) U.S. Cl. ...................................... 356/73.1

(58) Field of Classification Search ........................ None
See application file for complete search history.

(56) References Cited

U.S. PATENT DOCUMENTS

| | | | |
|---|---|---|---|
| 4,289,398 A * | 9/1981 | Robichaud | 356/73.1 |
| 4,497,575 A * | 2/1985 | Philipp | 356/73.1 |
| 5,000,568 A * | 3/1991 | Trutna et al. | 356/73.1 |
| 5,179,420 A * | 1/1993 | So et al. | 356/73.1 |
| 5,450,191 A * | 9/1995 | Parks et al. | 356/73.1 |
| 5,479,610 A * | 12/1995 | Roll-Mecak et al. | 714/25 |
| 6,256,090 B1 * | 7/2001 | Chen et al. | 356/73.1 |
| 6,876,786 B2 * | 4/2005 | Chliaguine et al. | 385/13 |
| 7,046,349 B2 * | 5/2006 | Everall et al. | 356/73.1 |
| 2007/0077067 A1 | 4/2007 | Wellbrock et al. | |

FOREIGN PATENT DOCUMENTS

| | | | |
|---|---|---|---|
| EP | 1235089 A1 * | 8/2002 | |
| EP | 1519181 A1 * | 3/2005 | |
| EP | 1672312 A1 * | 6/2006 | |
| WO | PCT/US2010/026194 | 3/2010 | |

OTHER PUBLICATIONS

F.L. Pedrotti, S.J. and L.S. Pedrotti, "Introduction to Optics", Prentice-Hall, New Jersey, 1987, pp. 291-300.
J.I. Pankove, "Optical Process in Semiconductors," Dover Publications, New York, 1971, pp. 217-221.
http://www.lunatechnologies.com/products/obr/obr_platform.html, 2008.
http://www.scientex.co.jp; High Resolution Optical Fiber Test Instrument.
http://www.yokogawa.com/tm/optfiber/aq7410b/tm-aq7410b_01.html.

* cited by examiner

*Primary Examiner* — Gordon Stock, Jr.
(74) *Attorney, Agent, or Firm* — Parsons Behle & Latimer (57) ABSTRACT

A fiber cable distortion detection system includes a broadband source, an optical source fiber disposed in optical communication with the broadband source, an optical fiber under test (FUT) disposed in optical communication with the optical source fiber and an optical spectrum analyzer disposed in optical communication with the optical source fiber. The system combines the refection of the distortion with the reflection from the source/FUT interface using a 1×2 fiber coupler, the location of the distortion is precisely determined with high resolution by the spectrum of the combined signal. The system is miniaturized to the size of a hand-held device suitable for use in airplane cable plant installation or in an environment where space is limited.

22 Claims, 5 Drawing Sheets

FIBER CABLE DISTORTION DETECTION SYSTEM AND METHOD

TECHNICAL FIELD

The present disclosure relates to fiber optic cables. More particularly, the present disclosure relates to a fiber cable distortion locator system and method for locating a distortion in a fiber optic cable at a short distance from an end face of the cable. Distortion in the cable may cause optical signal discontinuity.

BACKGROUND

Current and future generations of composite airplanes may extensively use fiber optic cables for size, weight, cost and EMI reduction. The number of fiber optic cables in a composite airplane may be many times that which is used in a conventional metal frame airplane. As the number of fiber optic cables increases, the potential for distortions which may arise in the optical fiber cable during installation may need to be addressed. Distortions in the fiber optic cables are rare and in some applications it may be desirable to verify their absence from the cables.

Due to the high density of fiber optic cable in the cable bundle, optical fibers may be bundled in tight spaces near the connector panel. Most distortions in the cable may occur at locations near the cable's end face which is coupled to the LRU (line replaceable unit) connectors' termini or inside its own termini. Conventional equipment (such as photon-counting, Michelson Interferometer, Optical Backscatter Reflectometer) for cable distortion detection may detect distortions in fiber optic cable with highest resolution of 5 cm. But these cable distortion detecting equipments that can detect cable distortions at a distance of less than 5 cm from the end face of the cable may be expensive, bulky, heavy and have limitations for testing multi-mode (MM) glass fiber and large core plastic optical fiber (POF). They are not suitable for field use onboard airplanes during the cable installation process.

Therefore, a low-cost, compact and easy-to-use fiber optic cable distortion detection system is needed for fiber optic cable installation.

SUMMARY

The present disclosure is generally directed to a fiber cable distortion detection system. An illustrative embodiment of the system includes a broadband source, an optical source fiber disposed in optical communication with the broadband source, an optical fiber under test disposed in optical communication with the optical source fiber and an optical spectrum analyzer disposed in optical communication with the optical source fiber.

In some embodiments, the fiber cable distortion detection system may include an LED driver circuit; a broadband LED disposed in electrical communication with the LED driver circuit; an optical source fiber disposed in optical communication with the broadband LED; and an optical spectrometer disposed in optical communication with the optical source fiber.

The present disclosure is further generally directed to a fiber cable distortion detection method. An illustrative embodiment of the method includes providing an optical source fiber; providing an optical fiber under test in optical communication with the optical source fiber; reflecting a fiber interface reflection signal from an interface between the optical fiber under test and the optical source fiber; transmitting a second signal into said optical fiber under test; forming a combined output signal; and forming a combined optical spectrum based on the combined output signal In some embodiments, the fiber cable distortion detection system may include a housing; an LED driver circuit provided in the housing; a broadband LED disposed in electrical communication with the LED driver circuit; an input fiber disposed in optical communication with the broadband LED; a fiber optic coupler disposed in optical communication with the input fiber; an optical source fiber disposed in optical communication with the fiber optic coupler; a fiber optic connector provided on the housing and disposed in optical communication with the optic source fiber; an output fiber disposed in optical communication with the fiber optic coupler; an optical spectrometer disposed in optical communication with the output fiber; a USB port provided on the housing and connected to the optical spectrometer; an alarm circuit connected to the optical spectrometer; and an alarm provided on the housing and connected to the alarm circuit.

In some embodiments, the fiber cable distortion detection method may include providing an optical source fiber; providing an optical fiber under test having a fiber distortion in optical communication with the optical source fiber; transmitting a broadband input optical signal through the optical source fiber; reflecting a fiber interface reflection signal from an interface between the optical fiber under test and the optical source fiber; transmitting a remaining portion of the input optical signal through the optical fiber under test; reflecting a fiber distortion reflection signal from the fiber distortion in the optical fiber under test; forming a combined output signal by combining the fiber distortion reflection signal with the fiber interface reflection signal; displaying a spectrum of the combined output signal; and calculating a location of the fiber distortion in the optical fiber under test using the spectrum.

DETAILED DESCRIPTION

The following detailed description is merely exemplary in nature and is not intended to limit the described embodiments or the applications and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description.

The fiber cable distortion detecting system and method of the present disclosure may be based on testing the interference of an input optical signal with an optical signal which is reflected from a distortion in a fiber optic cable using a broadband source which may operate in a continuous wave (CW) condition. The broadband source may be any wavelength range and may be capable of testing all types of fibers including single mode, multimode and large core plastic optical fibers (POF), for example and without limitation.

Figure 1:
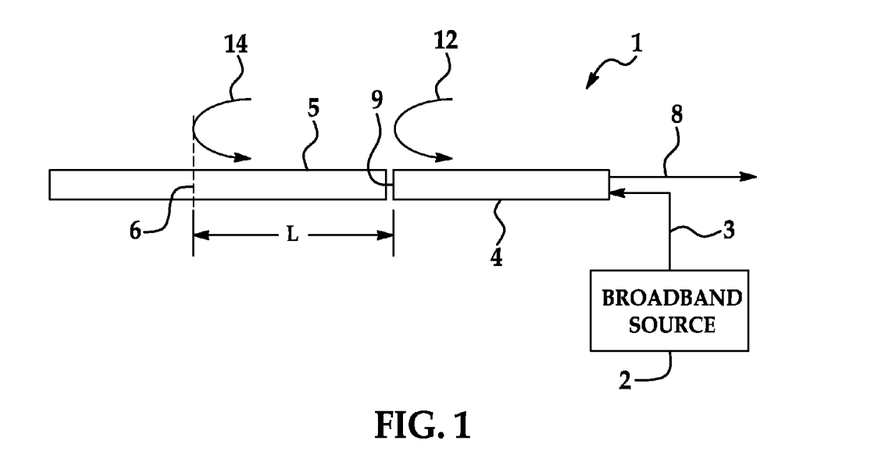
FIG. 1 is a schematic block diagram which illustrates a distortion detection principle utilized by an illustrative embodiment of the fiber cable distortion detection system.

Referring initially to FIG. 1, schematic block diagram which illustrates a distortion detection principle utilized by an illustrative embodiment of the fiber cable distortion detection system 1, hereinafter system, is shown. A broadband source 2 is adapted to emit an input optical signal 3 which may have a large number of wavelength components $\lambda_1, \lambda_2, \lambda_3 \ldots \lambda_n$, and may be coupled to an optical source fiber 4. An optical fiber under test (FUT) 5 may be coupled to the optical source fiber 4. In some embodiments, the broadband source 2 may be an LED, for example and without limitation. The input optical signal 3 may be emitted from the broadband source 2 and into and through the optical source fiber 4. At the fiber interface 9 between the optical fiber under test 5 and the optical source fiber 4, a portion of the input optical signal 3 may be reflected back through the optical source fiber 4 as a fiber interface reflection signal 12. The remaining portion of the input optical signal 3 may be transmitted beyond the fiber interface 9 through the optical fiber under test 5. In the event that the optical fiber under test 5 has a fiber distortion 6 at a distance (L) from the optical source fiber 4, the remaining portion of the input optical signal 3 may be reflected from the fiber distortion 6 and back through the optical fiber under test 5 and the optical source fiber 4 as a fiber distortion reflection signal 14. The fiber distortion reflection signal 14 may combine either constructively or destructively with the fiber interface reflection signal 12 to form a combined output optical signal 8.

Depending on the distance (L) of the fiber distortion 6 from the optical source fiber 4, for wavelengths of the fiber distortion reflection signal 14 which form a $2\pi$ phase shift relative to the phase of the input optical signal 3 after traveling a distance of 2 L, the constructive interference of the fiber distortion reflection signal 14 and the fiber interface reflection signal 12 may form the "peaks" and "valleys" on the combined output optical signal 8. For wavelengths of the fiber distortion reflection signal 14 which form a $\pi$ phase shift relative to the phase of the fiber interface reflection signal 12 after traveling a distance of 2 L, the destructive interference of the fiber distortion reflection signal 14 and the fiber interface reflection signal 12 become zero on the combined output optical signal 8. By detecting the spacing between the peaks or valleys in the combined output optical signal 8, the location of the fiber distortion 6 at a short distance from the fiber interface 9 may be determined with a resolution of better than about 0.1 mm. This phenomenon is based on the principle of the Fabry-Perot resonator theory in optics. The spacing of the peaks or valleys in the combined output optical signal 8 is known as the free spectral range (FSR) of the resonator.

In the example shown in FIG. 1, the relation between FSR ($\Delta\lambda$) and L is described by the equation (I) below:

$$L = \lambda_i^2 / 2 \times n_{eff} \times \Delta\lambda$$

Where $n_{eff}$ is the index refraction (or group index) of the optical fiber and $\lambda_i$ is the operating wavelength of the broadband source.

Under circumstances in which a fiber distortion 6 is not present in the optical fiber under test 5, the input optical signal 3 may be transmitted beyond the fiber interface 9 and through the optical fiber under test 5 without a fiber distortion reflection signal 14 forming and combining with the fiber interface reflection signal 12 to form the combined output optical signal 8. In that case, no interference to the fiber interface reflection signal 12 may occur. Therefore, the combined optical spectrum which is displayed on the OSA spectrum display 32 may correspond to the OSA spectrum of the fiber interface reflection signal 12, indicating that no fiber distortion 6 is present in the optical fiber under test 5.

Figure 2:
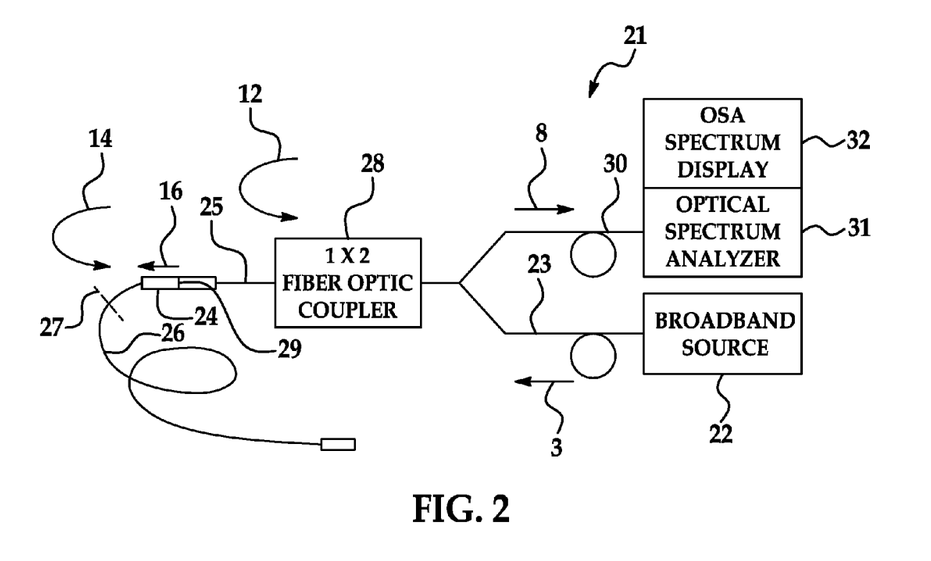
FIG. 2 is a schematic block diagram of an illustrative embodiment of the fiber cable distortion detection system in implementation of the system.

Referring next to FIG. 2, a schematic block diagram of an illustrative embodiment of the fiber cable distortion detection system 21 is shown. The system 21 may include a broadband source 22 which may be adapted to emit an input optical signal 3 having a large number of wavelength components $\lambda_1, \lambda_2, \lambda_3 \ldots \lambda_n$. A 1×2 fiber optic coupler 28 may be provided in optical communication with the broadband source 22 through an input fiber 23. An optical spectrum analyzer (OSA) 31 may be provided in optical communication with the fiber optic coupler 28 through an output fiber 30. An OSA spectrum display 32 may interface with the optical spectrum analyzer 31. An optical source fiber 25 may be provided in optical communication with the fiber optic coupler 28. An optical fiber under test (FUT) 26 may be coupled to the optical source fiber 25 through an optical fiber connector 24 and may have a fiber distortion 27 at a known distance from the optical source fiber 25.

In operation of the system 21, an optical fiber under test 26 having a fiber distortion 27 is connected to the optical source fiber 25 at the optical fiber connector 24. In an exemplary application, the fiber distortion 27 may be located 3.6 cm (by physical measurement) from the optical source fiber 25. A broadband input optical signal 3 is emitted from the broadband source 22 and through the input fiber 23, the fiber optic coupler 28 and the optic source fiber 25. At the fiber interface 29 between the optical fiber under test 26 and the optical source fiber 25, a portion of the input optical signal 3 may be reflected back through the optical source fiber 25 and the fiber optic coupler 28 as a fiber interface reflection signal 12. The remaining portion of the input optical signal 3 may be transmitted beyond the fiber interface 29 through the optical fiber connector 24 and optical fiber under test 26 as a remaining broadband optical signal 16. The remaining broadband optical signal 16 of the input optical signal 3 may be reflected from the fiber distortion 27 and back through the optical fiber under test 26 and the optical source fiber 25 as a fiber distortion reflection signal 14. In the fiber optic coupler 28, the fiber interface reflection signal 12 and the fiber distortion reflection signal 14 may combine to form the output optical signal 8. The output optical signal 8 may be transmitted from the fiber optic coupler 28 to the optical spectrum analyzer 31 through the output fiber 30.

Figure 3:
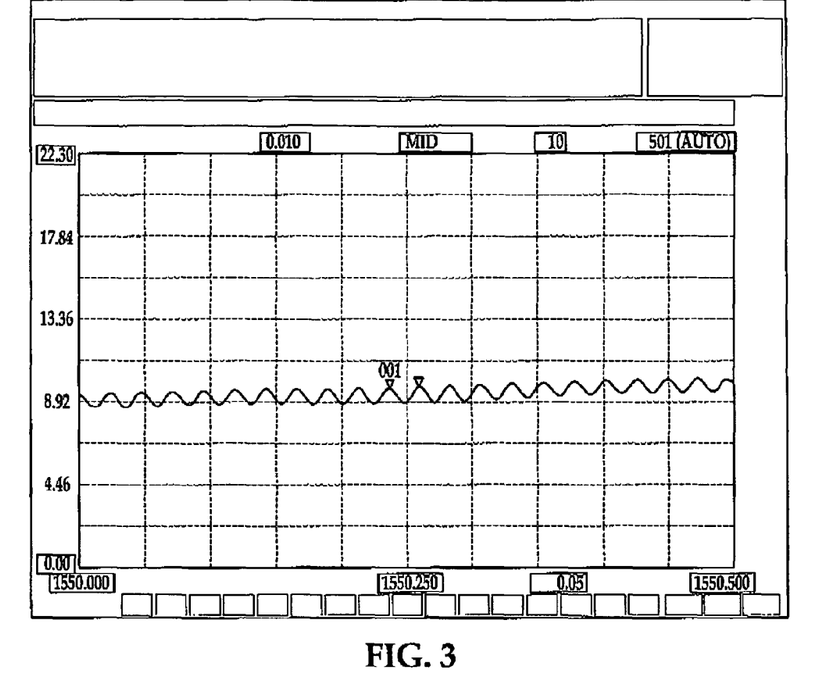
FIG. 3 is an optical spectrum analyzer (OSA) spectrum display in implementation of an illustrative embodiment of the fiber cable distortion detection system, more particularly illustrating an OSA spectrum in which a distorted fiber under test is connected to the system.

An exemplary spectrum of the combined output optical signal 8 as measured and analyzed by the optical spectrum analyzer 31 and displayed on the OSA spectrum display 32 is shown in FIG. 3. The measured FSR (Free Spectral Range) from the spectrum in FIG. 3 is 0.022 nm. The parameters for calculation of the location of the fiber distortion 27 using equation (I) above are presented in Table (I) below. The value for L calculated using equation (I) is 3.64 cm, which is in good agreement with the measured results of L using a physical measurement technique mentioned above.

TABLE I

Fiber distortion distance calculations

| Parameters | Symbols | Measured data | Units |
| --- | --- | --- | --- |
| Input wavelength | $\lambda_i$ | 1550 | nm |
| Free Spectral Range (FSR) | $\Delta\lambda$ | 0.022 | nm |
| Fiber effective index of refraction index of refraction | $n_{eff}$ | 1.5 | |
| Defect spacing | $L = \lambda_i^2 / 2 \times n_{eff} \times \Delta\lambda$ | 3.64 | cm |

Figure 4:
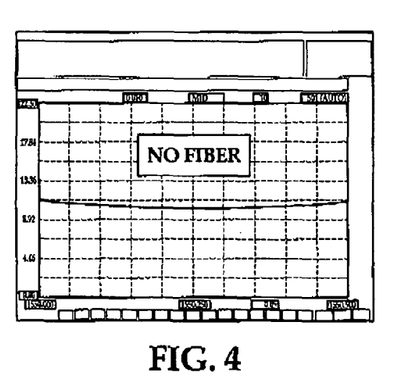
FIG. 4 is an optical spectrum analyzer (OSA) spectrum display in implementation of an illustrative embodiment of the fiber cable distortion detection system, more particularly illustrating an OSA spectrum in which a fiber under test is not connected to the system.
Figure 5:
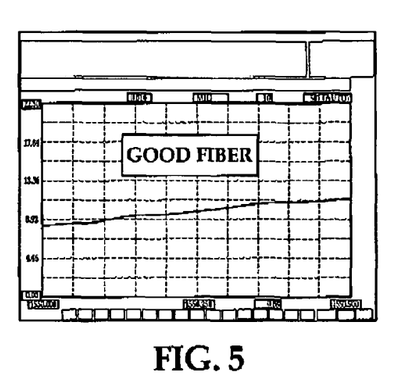
FIG. 5 is an optical spectrum analyzer (OSA) spectrum display in implementation of an illustrative embodiment of the fiber cable distortion detection system, more particularly illustrating an OSA spectrum in which an undistorted fiber under test is connected to the system.

An optical spectrum analyzer (OSA) spectrum display in which the optical fiber under test 26 (FIG. 2) is not connected to the optical source fiber 25 is shown in FIG. 4. An OSA spectrum display in which an optical fiber under test 26 without a fiber distortion 27 (FIG. 2) is connected to the optical source fiber 25 is shown in FIG. 5. The OSA spectra shown in FIGS. 4 and 5 have no peaks and valleys due to the absence of a fiber distortion reflection signal 14 (FIG. 2) which would otherwise interfere with the fiber interference reflection signal 12 in the output optical signal 8.

Figure 6:
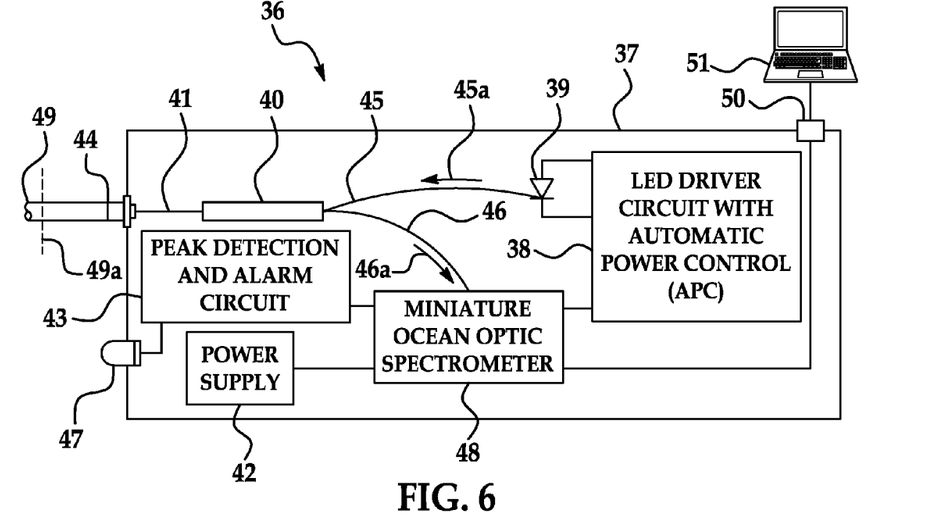
FIG. 6 is a block diagram which illustrates an illustrative hand-held embodiment of the fiber cable distortion detection system.
Figure 7:
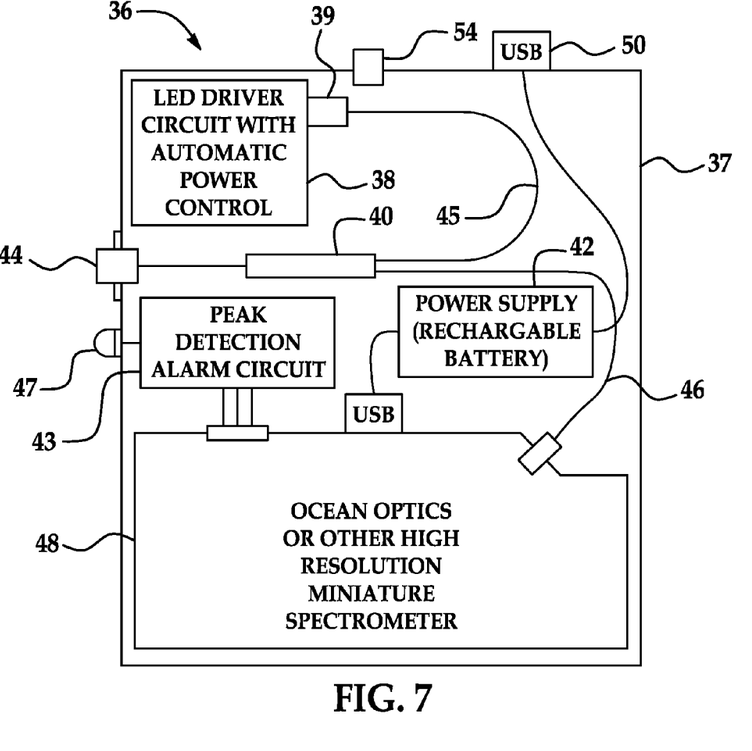
FIG. 7 is a block diagram which illustrates an engineering design of an illustrative hand-held embodiment of the fiber cable distortion detection system.
Figure 8:
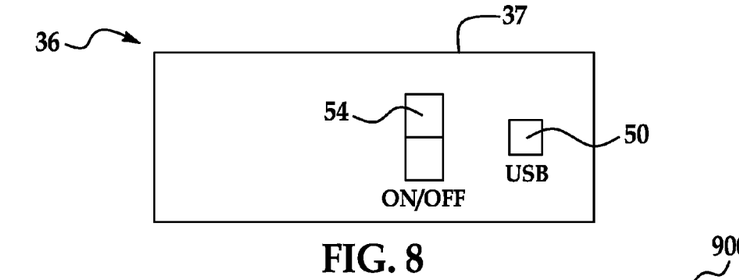
FIG. 8 is a top view of the fiber cable distortion detection system illustrated in FIG. 7.

Referring next to FIGS. 6-8, a block diagram which illustrates an illustrative hand-held embodiment of the fiber cable distortion detection system 36 is shown in FIG. 6 and an engineering design of an illustrative hand-held embodiment of the system 36 is shown in FIGS. 7 and 8. The system 36 may include a housing 37. An LED driver circuit with automatic power control (APC) 38 (hereinafter LED driver circuit 38) may be provided in the housing 37. A broadband LED 39 may be electrically connected to the LED driver circuit 38. A fiber optic coupler 40 may be connected to the broadband LED 39 through an input fiber 45. A fiber optic connector 44 provided on the outside of the housing 37 may be connected to the fiber optic coupler 40 through an optical source fiber 41.

An optical spectrometer 48, which may be a miniature Ocean Optics spectrometer (or other high resolution miniature spectrometer), may be connected to the fiber optic coupler 40 through an output fiber 46. A power supply 42 may be connected to the optic spectrometer 48. In some embodiments, a peak detector and alarm circuit 43 may be provided in the housing 37 and connected to the optical spectrometer 48. An alarm 47, which may be an audio alarm, a visual alarm or both, may be provided on the exterior of the housing 37 and connected to the peak detector and alarm circuit 43. A laptop connector 50, which may be a USB port, for example and without limitation, may be provided on the housing 37 and connected to the optical spectrometer 48. A laptop computer 51 may be connected to the laptop connector 50. As shown in FIGS. 7 and 8, in some embodiments an on/off switch 54 may be provided on the housing 37 and connected between the power supply 42 and the optic spectrometer 48 to facilitate turning the system 36 on and off.

In typical operation of the system 36, an optical fiber under test 49 having a fiber distortion 49a is connected to the optical source fiber 41 at the fiber optic connector 44. The LED driver circuit 38 causes the broadband LED 39 to generate a broadband input optical signal 45a through the input fiber 45, the fiber optic coupler 40 and the optical source fiber 41. At the fiber interface between the optical source fiber 41 and the optical fiber under test 49, a portion of the input optical signal 45a may be reflected back through the optical source fiber 41 and the fiber optic coupler 40 as a fiber interface reflection signal (not illustrated). The remaining portion of the input optical signal 45a may be transmitted beyond the fiber interface (not illustrated) through the optical fiber under test 49 as a remaining broadband optical signal (not illustrated). The remaining broadband optical signal of the input optical signal 45a may be reflected from the fiber distortion 49a and back through the optical fiber under test 49, the optical source fiber 41 and the fiber optic coupler 40 as a fiber distortion reflection signal (not illustrated). In the fiber optic coupler 40, the fiber distortion reflection signal may combine with the interface reflection signal (not illustrated) to form a combined output optical signal 46a.

The combined output optical signal 46a may be transmitted through the output fiber 46 to the optical spectrometer 48. The optical spectrometer 48 may analyze the combined output optical signal 46a, generate a spectrum and transmit the spectrum of the combined output optical signal 46a to the laptop computer 51, which may display the spectrum. The laptop computer 51 may also calculate and display the location of the fiber distortion 49a from the end of the optical fiber under test 49 using equation (I) above. Under some circumstances, the optic spectrometer 48 may activate the peak detector and alarm circuit 43 to turn on the alarm 47. With the alarm and alarm circuit built in, system 36 may be designed to be operable without the laptop computer 51, further facilitating its use in an environment with very limited space.

Figure 9:
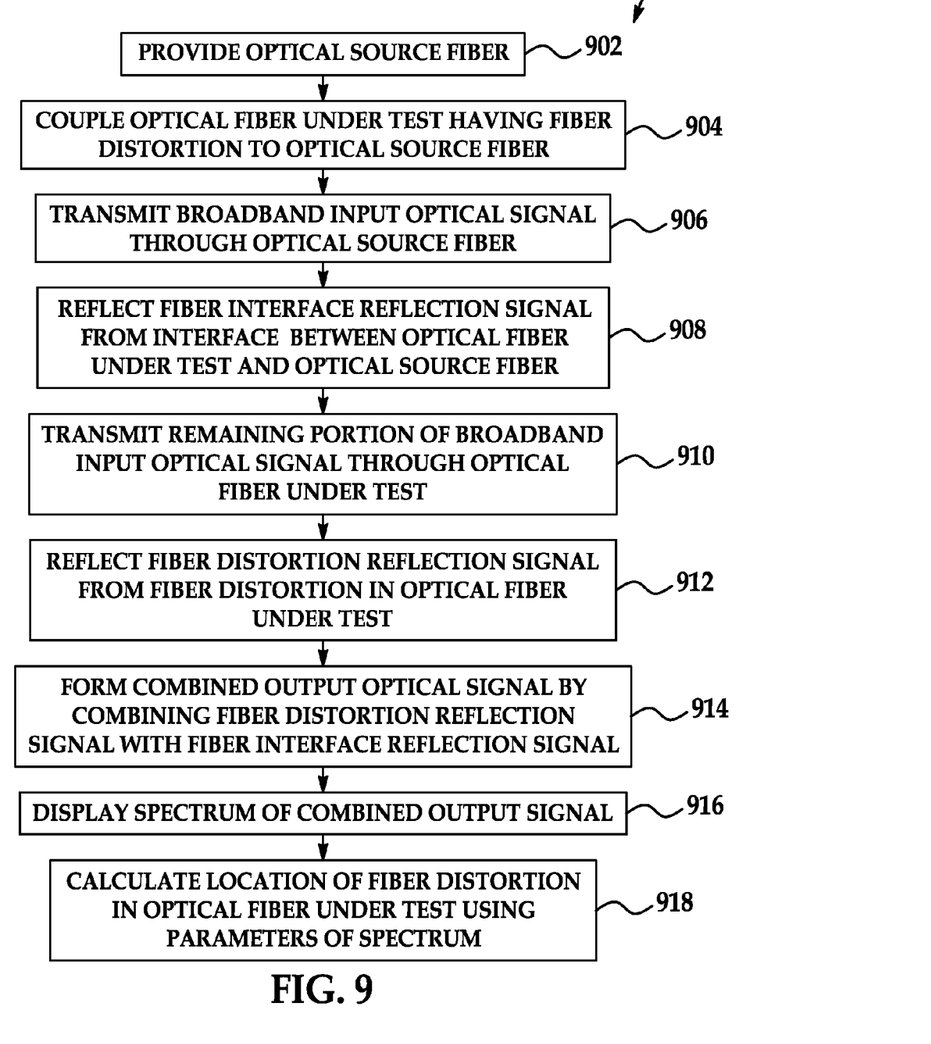
FIG. 9 is a flow diagram of an illustrative embodiment of the fiber cable distortion detection method.

Referring next to FIG. 9, a flow diagram 900 which illustrates an illustrative embodiment of the fiber cable distortion detection method is shown. In block 902, an optical source fiber is provided. In block 904, an optical fiber under test having a fiber distortion an unknown distance from the end of the optical fiber under test is coupled to the optical source fiber. In block 906, an input optical signal which may be a broadband input optical signal is transmitted through the optical source fiber. In some embodiments, the broadband input optical signal may be emitted from a broadband LED. In block 908, a fiber interface reflection signal is reflected from the interface between the optical fiber under test and the optical source fiber. In block 910, the remaining portion of the broadband input optical signal is transmitted through the optical fiber under test. In block 912, a fiber distortion reflection signal is reflected from the fiber distortion in the optical fiber under test. In block 914, a combined output optical signal is formed by combining the optical fiber distortion reflection signal with the fiber interface reflection signal. In block 916, a combined optical spectrum based on the combined output optical signal is formed and displayed. In block 918, the location of the fiber distortion in the optical fiber under test (distance of the fiber distortion from the end of the fiber coupled to the optical source fiber) is calculated using the parameters of the spectrum. This may be performed using equation (I) as was described herein above.

Figure 10:
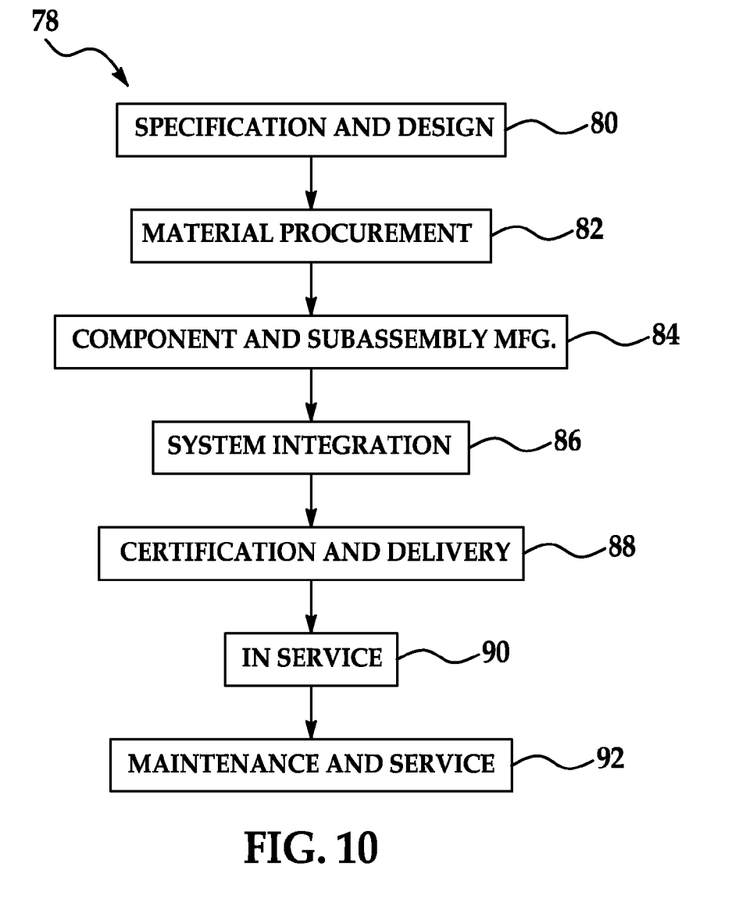
FIG. 10 is a flow diagram of an aircraft production and service methodology.
Figure 11:
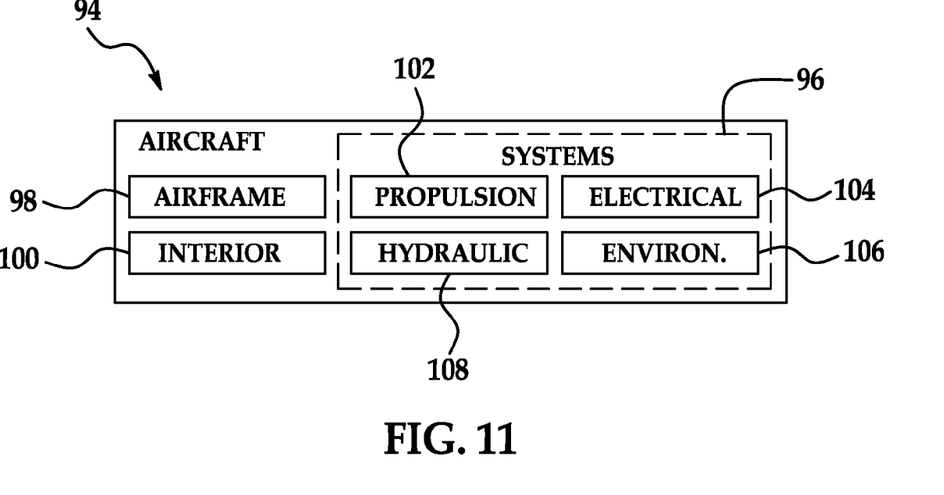
FIG. 11 is a block diagram of an aircraft.

Referring next to FIGS. 10 and 11, embodiments of the disclosure may be used in the context of an aircraft manufacturing and service method 78 as shown in FIG. 10 and an aircraft 94 as shown in FIG. 11. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A fiber cable distortion detection system, comprising:
   a broadband source;
   an optical source fiber disposed in optical communication with said broadband source;
   a fiber optic connector, in optical communication with said optical source fiber, configured to couple to an optical fiber under test at a fiber interface; and
   an optical spectrum analyzer disposed in optical communication with said optical source fiber, configured to determine a location of an unknown fiber distortion in the optical fiber under test by analyzing a spectrum of a combined output signal comprising an optical reflection from the fiber interface and from the fiber distortion.

2. The system of claim 1 wherein said broadband source comprises a broadband LED.

3. The system of claim 1 further comprising a spectrum display interfacing with said optical spectrum analyzer.

4. The system of claim 1 wherein said optical spectrum analyzer comprises a laptop computer.

5. The system of claim 1 further comprising a fiber optic coupler disposed in optical communication with said broadband source, said optical source fiber and said optical spectrum analyzer.

6. The system of claim 5 further comprising an input fiber connecting said broadband source and said fiber optic coupler.

7. The system of claim 5 further comprising an output fiber connecting said fiber optic coupler and said optical spectrum analyzer.

8. A fiber cable distortion detection system, comprising:
   an LED driver circuit;
   a broadband LED disposed in electrical communication with said LED driver circuit;
   an optical source fiber disposed in optical communication with said broadband LED;
   a fiber optic connector, in optical communication with said optical source fiber, configured to couple to an optical fiber under test at a fiber interface; and
   an optical spectrometer disposed in optical communication with said optical source fiber and configured to determine a location of an unknown fiber distortion in the optical fiber under test by analyzing a spectrum or a combined output signal comprising an optical reflection from the fiber interface and an optical reflection from the fiber distortion.

9. The system of claim 8 further comprising a fiber optic connector disposed in optical communication with said optical source fiber.

10. The system of claim 8 further comprising a peak detection and alarm circuit connected to said optic spectrometer and an alarm connected to said peak detection and alarm circuit, configured to detect peaks in said combined output signal, indicative of said fiber distortion, and to activate said alarm.

11. The system of claim 8 further comprising a laptop computer connected to said optic spectrometer.

12. The system of claim 8 further comprising a fiber optic coupler disposed in optical communication with said broadband LED, said optical source fiber and said optical spectrometer.

13. The system of claim 11 further comprising a laptop connector connected to said optic spectrometer and wherein said laptop computer is connected to said laptop connector.

14. The system of claim 12 further comprising an input fiber connecting said broadband LED and said fiber optic coupler.

15. The system of claim 12 further comprising an output fiber connecting said fiber optic coupler and said optical spectrometer.

16. A fiber cable distortion detection method, comprising:
   providing an optical source fiber;
   providing an optical fiber under test in optical communication with said optical source fiber, the optical fiber under test having an unknown fiber distortion at an undetermined location;
   reflecting a fiber interface reflection signal from an interface between said optical fiber under test and said optical source fiber;
   transmitting a second signal into said optical fiber under test;
   forming a combined output signal; and
   forming a combined optical spectrum based on said combined output signal.

17. The method of claim 16 wherein said transmitting a second signal into said optical fiber under test comprises reflecting said second signal from said fiber distortion, and further comprising forming said combined output signal by combining said second signal with said fiber interface reflection signal and calculating the location of said fiber distortion in said optical fiber under test from said combined optical spectrum.

18. The method of claim 17 further comprising transmitting an input optical signal through said optical source fiber.

19. The method of claim 18 wherein said transmitting an input optical signal through said optical source fiber comprises transmitting a broadband input optical signal through said optical source fiber.

20. The method of claim 19 wherein said transmitting a broadband input optical signal through said optical source fiber comprises providing a broadband input optical signal from a broadband LED through said optical source fiber.

21. A fiber cable distortion detection system, comprising:
a housing;
an LED driver circuit provided in said housing;
a broadband LED disposed in electrical communication with said LED driver circuit;
an input fiber disposed in optical communication with said broadband LED;
a fiber optic coupler disposed in optical communication with said input fiber;
an optical source fiber disposed in optical communication with said fiber optic coupler;
a fiber optic connector provided on said housing and disposed in optical communication with said optic source fiber, configured to couple to an optical fiber under test at a fiber interface;
an output fiber disposed in optical communication with said fiber optic coupler;
an optical spectrometer disposed in optical communication with said output fiber;
a USB port provided on said housing and connected to said optical spectrometer;
a peak detection and alarm circuit connected to said optical spectrometer, configured to detect peaks in a combined output signal comprising an optical reflection from the fiber interface and an optical reflection from an unknown fiber distortion at an undetermined location in the fiber under test, said peaks being indicative of said fiber distortion; and
an alarm provided on said housing and connected to said peak detection and alarm circuit, configured to provide an indication of the presence of said fiber distortion.

22. A fiber cable distortion detection method, comprising:
providing an optical source fiber;
providing an optical fiber under test having an unknown fiber distortion at an undetermined location, in optical communication with said optical source fiber;
transmitting a broadband input optical signal through said optical source fiber;
reflecting a fiber interface reflection signal from an interface between said optical fiber under test and said optical source fiber;
transmitting a remaining portion of said input optical signal through said optical fiber under test;
reflecting a fiber distortion reflection signal from said fiber distortion in said optical fiber under test;
forming a combined output signal by combining said fiber distortion reflection signal with said fiber interface reflection signal;
displaying a spectrum of said combined output signal; and
calculating the location of said fiber distortion in said optical fiber under test using said spectrum.

* * * * *